US012746456B2

(12) United States Patent
Jiang

(10) Patent No.: US 12,746,456 B2
(45) Date of Patent: Sep. 29, 2026

(54) METHOD FOR WAKING UP SMART MAGIC CUBE AND SMART MAGIC CUBE

(71) Applicant: GANCUBE LTD., Guangdong (CN)

(72) Inventor: Ganyuan Jiang, Guangzhou (CN)

(73) Assignee: GANCUBE LTD., Guangdong (CN)

( * ) Notice: Subject to any disclaimer, the term of this patent is extended or adjusted under 35 U.S.C. 154(b) by 309 days.

(21) Appl. No.: 18/333,557

(22) Filed: Jun. 13, 2023

(65) Prior Publication Data

US 2024/0269544 A1 Aug. 15, 2024

(30) Foreign Application Priority Data

Feb. 10, 2023 (CN) ........................ 202310111212.6

(51) Int. Cl.
*A63F 9/08* (2006.01)
*A63F 9/06* (2006.01)
*G01P 15/18* (2013.01)

(52) U.S. Cl.
CPC .......... *A63F 9/0842* (2013.01); *A63F 9/0612* (2013.01); *G01P 15/18* (2013.01)

(58) Field of Classification Search
CPC .................. A63F 9/0842; A63F 9/0612; A63F 2009/2494; A63F 2009/2442; A63F 2009/2488; A63F 2250/1063; A63F 2250/18; G01P 15/18; G09B 1/06; Y02D 30/70; G05B 19/0423; G06F 9/4418; G06F 1/3206; G06F 1/3234; Y02E 60/10
USPC ...................................................... 273/153 R
See application file for complete search history.

(56) References Cited

U.S. PATENT DOCUMENTS

| | | | | |
|---|---|---|---|---|
| 11,077,359 | B1 * | 8/2021 | Wigh | A63F 9/0842 |
| 2010/0194682 | A1 * | 8/2010 | Orr | G06F 3/04886<br>345/173 |
| 2022/0379194 | A1 * | 12/2022 | Garofalo | A63F 9/0468 |

* cited by examiner

*Primary Examiner* — Michael C Grant
(74) *Attorney, Agent, or Firm* — MUNCY, GEISSLER, OLDS & LOWE, P.C.

(57) ABSTRACT

A method for waking up smart magic cube and a smart magic cube are provided. An accelerometer is arranged on the smart magic cube. When the smart magic cube is in a dormant state, an acceleration of the smart magic cube in any direction of the three axes is detected by the accelerometer. When detecting that an acceleration value of the is acceleration greater than a preset awakening threshold, the smart magic cube is wakened up and enters a normal working mode. The method for waking up smart magic cube and the smart magic cube provided by the embodiment of the present disclosure can greatly save an energy consumption of the smart magic cube when it is in the dormant state, thus improving a battery life of the smart magic cube, and giving users a better and more intelligent experience.

13 Claims, 18 Drawing Sheets

METHOD FOR WAKING UP SMART MAGIC CUBE AND SMART MAGIC CUBE

TECHNICAL FIELD

The subject matter herein generally relates to a field of educational toys, in particular, relates to a method for waking up smart magic cube that is in a sleep state for reducing power consumption, and a smart magic cube that can realize the method.

BACKGROUND

Since smart magic cubes are equipped with control modules, sensing devices, and communication modules inside for recording rotation states of the smart magic cubes in time during a rotation process of the smart magic cube, so that the smart magic cubes are able to connect to smart terminal devices, such as mobile phones, thus, lovers for the smart magic cubes can get information of the smart magic cubes, such as rotation information, restoration information, restoration time information of the smart magic cubes, etc. The above-mentioned components all need to be provided with electric energy by a battery to meet work needs. The battery of the smart magic cubes, due to operation needs, is not able to replenish power at any time, either the smart magic cubes need to replace the battery regularly, or the smart magic cubes need to be charged regularly. Therefore, to reduce the number of times of battery replacement or battery charging, it may bring users a better experience and achieve a purpose of energy saving and environmental protection.

By research, it is found that an actual use time of the smart magic cubes (that is, a time when each functional module of the smart magic cubes needs to work at full power) is relatively limited, and most of the time, the smart magic cubes are in a static state, which is a state that does not need to work at full speed. Therefore, in order to reduce a loss of electric energy as far as possible, and reach a purpose of energy-saving, to prolong a service life of the battery, most of the smart magic cubes in prior art has provided a dormancy function. That is, when the smart magic cubes are detected to be in an idle state within a certain period of time, the smart magic cubes may enter a dormancy state, and most of the functional modules are in a low power consumption or even off state, thereby saving a lot of power.

When the smart magic cubes are in the dormancy state, it is necessary to be able to monitor the states of the smart magic cubes in real time, so as to find that the smart magic cubes need to enter a working mode in time, so as to wake up each functional module in time to enter a full-power working mode from the dormancy state or off state, so as to record the rotation state of the smart magic cubes in time.

In order to achieve above purpose, products of the smart magic cubes provided by the prior art are usually wakened up by rotating one face of the smart magic cube to wake up a control module (micro control unit, MCU). Although the above method can achieve an effect of waking up the smart magic cube in time, when the smart magic cube is in a dormancy state, it is necessary to monitor IO (Input/Output ports connected to six faces of the smart magic cube in real time for interrupting monitoring. In the prior art, the power consumption of the monitoring function of the smart magic cubes in the dormancy state is still relatively high, which has a certain impact on a normal working time of the battery. At the same time, the smart magic cube is wakened up by rotating. When the smart magic cube detects that one face is rotated and wakened up, it still needs a certain wake-up time.

During the wake-up time, operating status of the smart magic cubes are not able to be recorded in time, giving users of the smart magic cubes an experience of waiting for power on. That is, giving users of the smart magic cubes a kind of experience that the products of the smart magic cubes need to go through a power-on operation every time they use it, thus bringing some bad experience to a real intelligence of the smart magic cubes.

SUMMARY

Aiming at above technical problems existing in current smart magic cubes, the present disclosure provides a method for waking up smart magic cube. An accelerometer is defined inside the smart magic cube and acceleration values of three axes of the smart magic cube are detected by the accelerometer, and when the acceleration values in any direction of the three axes of the smart magic cube exceeds a preset value, the smart magic cube can be automatically wakened up from a dormancy state, and each of the functional modules enters a normal working mode. The method for waking up smart magic cube provided by the embodiment of the present disclosure can reduce a power consumption of monitoring the smart magic cube when the smart magic cube is in the dormant state. Compared with the current technology, the present disclosure can achieve more energy-saving purposes. At the same time, when the user picks up the smart magic cube, the smart magic cube starts to enter the normal working mode without any action required by the user of the smart magic cube, giving the user a good experience of using the smart magic cube more intelligently.

A first embodiment of the present disclosure provides a method for waking up smart magic cube, includes:

- step S10, detecting acceleration values of an X-axis, a Y-axis and a Z-axis of a smart magic cube by an accelerometer arranged in the smart magic cube;
- step S20, obtaining the acceleration values of the X-axis, the Y-axis, and the Z-axis of the smart magic cube when detecting that an acceleration is generated in any one of directions of the X-axis, the Y-axis, and the Z-axis of the smart magic cube;
- step S30, comparing the acceleration values of the X-axis, the Y-axis, and the Z-axis of the smart magic cube with an awakening threshold, and when one of the acceleration values of the X-axis, the Y-axis, and the Z-axis of the smart magic cube is greater than the awakening threshold, sending an awakening signal to a micro control unit of the smart magic cube by the accelerometer;
- step S40, restarting a system of the smart magic cube by the micro control unit to enable the smart magic cube to enter a normal working mode.

The method for waking up smart magic cube provided by the embodiment of the present disclosure is to detect the acceleration values of the smart magic cube in three axis directions by arranging an accelerometer in a ball axis of the smart magic cube, and when the smart magic cube enters the dormancy state. When any of the acceleration values reaches the threshold, it means that the smart magic cube may be used and needs to enter the normal working mode to record the states of the smart magic cube. Then, the awakening signal is sent to a micro control unit (MCU), and the smart magic cube enters the normal working mode by a MCU control system, that is, all functional modules in the smart magic cube are controlled to enter the working mode. At this time, any operation information on the smart magic cube may be recorded in time and uploaded to a terminal device connected to the smart magic cube. When the smart magic cube is in the dormancy state, a battery in the smart magic cube only needs to provide a working power to the accelerometer, and the MCU only needs to monitor an interrupt and introduce an interface state. Other modules of the smart magic cube can enter the dormancy state or even close state without using power of the battery, which can greatly reduce an energy consumption of the smart magic cube in the dormancy state and increase a working time of the battery, and improve user's using experience. At the same time, when the user picks up the smart magic cube, which makes the smart magic cube produce an acceleration, it usually takes a certain time for the user to rotate and use the smart magic cube, during a period of the certain time, the MCU has enough time to enter the normal working mode. At this time, when the user rotates the smart magic cube, all kinds of sensors arranged in the smart magic cube enter the normal working mode, which can detect and record the user's operation normally, thus enabling the user to have an experience that the smart magic cube can intelligently record user's operation at any time, increasing user's operating experience.

Based on a same purpose, the present disclosure further provides a smart magic cube, the smart magic cube includes a ball shaft, six central blocks, eight corner blocks, and twelve edge blocks, the ball shaft is arranged at a center of the smart magic cube, the ball shaft defines a micro control unit, an HP filter, and an accelerometer, and the accelerometer is connected to the micro control unit by the HP filter. Each of rotating shafts in the ball shaft defines one of the six central blocks, one of the twelve edge blocks is arranged between every adjacent two of the six central blocks, and one of the eight corner blocks is arranged between every adjacent three of the twelve edge blocks. The smart magic cube performs the method for waking up smart magic cube by the accelerometer and the micro control unit.

In the smart magic cube provided by the embodiment of the present disclosure, by defining an accelerometer and writing an embedded program, the method for waking up smart magic cube provided by the above embodiment may be realized when the embedded program is running. Thereby, the energy consumption of the smart magic cube in a dormancy mode may be saved. At the same time, it provides customers with an experience in which the smart magic cube can intelligently record its operations at any time, increasing the user's operating experience.

Based on the same purpose, the present disclosure further provides a computer-readable storage medium having stored thereon instructions that, when executed by a micro control unit and an accelerometer of a smart magic cube, causes the micro control unit and the accelerometer to execute instructions of a method for waking up smart magic cube in the first embodiment.

BRIEF DESCRIPTION OF THE DRAWINGS

In order to more clearly illustrate technical solutions in the embodiments of the present disclosure, the following may briefly introduce the drawings that need to be used in the description of the embodiments. Obviously, the drawings in the following description are some embodiments of the present disclosure. For those of ordinary skill in the art, on a premise of not paying creative work, other drawings may also be obtained according to these drawings.

REFERENCE NUMBER

Figure 1:
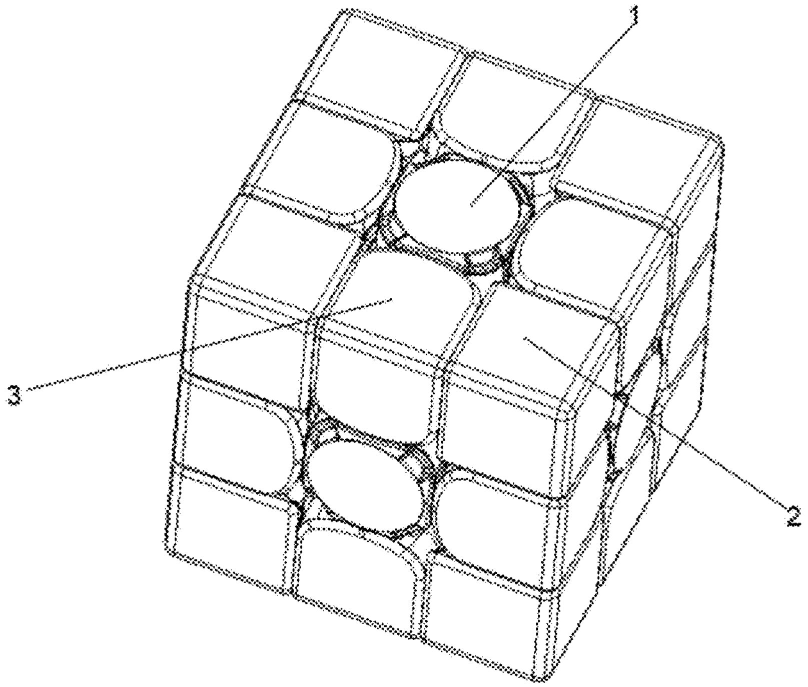
FIG. 1 is a structural schematic diagram of a smart magic cube according to one embodiment of the present disclosure.

Reference numerals in the drawings: 1: central block; 2: corner block; 3: edge block; 4: ball shaft; 41: ball shaft housing; 411: upper half housing; 412: lower half housing; 42: rotating shaft; 421: right rotating shaft; 422: left rotating shaft; 423: front rotating shaft; 424: rear rotating shaft; 425: upper rotating shaft; 426: lower rotating shaft; 44: second accommodation space; 45: battery compartment; 46: battery; 47: battery cover; 5: sensing device; 51: master circuit board; 511: first circuit board; 512: second circuit board; 52: slave circuit board; 522: long-stripped connection structure; 531: first electronic sensing element; 532: second electronic sensing element; 533: third electronic sensing element; 534: fourth electronic sensing element; 535: fifth electronic sensing element; 536: sixth electronic sensing element; 54: positioning module; 55: circuit board fixing base; 551: first fixing platform; 552: second fixing platform; 61: antenna; 62: antenna fixing base.

DETAILED DESCRIPTION

In order to make purposes, technical solutions and advantages of the present disclosure clearer, technical solutions of the present disclosure will be clearly and completely described by implementation with reference to the accompanying drawings in the embodiments of the present disclosure. Obviously, described embodiments are part of the embodiments of the present disclosure, but not all embodiments. Based on the embodiments of the present disclosure, all other embodiments obtained by persons of ordinary skill in the art without making creative efforts belong to a protection scope of the present disclosure.

In the description of the present disclosure, a "first" and a "second" described is only for a purpose of distinguishing technical features, it cannot be understood as indicating or implying relative importance or implicitly indicating a number of indicated technical features or implicitly indicating a sequence of the indicated technical features.

In the description of the present disclosure, unless otherwise clearly defined, words such as setting should be understood in a broad sense, and those skilled in the art can reasonably determine specific meanings of the above words in the present disclosure in combination with specific content of the technical solutions.

The inventor, as an engineer engaged in a research and development of the smart magic cube, provides various implementation schemes of the smart magic cube. After depth research on existing methods for waking up smart magic cube, it is found that when existing smart magic cube enters a dormancy state, when user picks up the smart magic cube and rotates one of its faces, a MCU module of the smart magic cube may receive an awakening trigger signal, and wake up the smart magic cube into a normal working mode. Although the method for waking up smart magic cube provided by the prior art may accurately determine that the smart magic cube is indeed in use, and enter the normal working mode from a dormancy mode in time. However, since the user does not deliberately rotate a certain face when turning the smart magic cube, but may randomly rotate any face, it is necessary to detect user's rotation operation when the user rotates any face, and when the smart magic cube is in the dormancy state, it needs to detect IO ports on all six faces, so as to receive an awakening signal in time. In this way, the smart magic cube requires relatively high energy consumption during a process of dormancy monitoring, resulting in poor user experience. For example, a button battery arranged in the smart magic cube may need to be replaced or recharged after several months of use, even if it is not operated. Otherwise, the button battery may be exhausted and all functional modules of the smart magic cube may not work properly due to lack of power. On the other hand, the awakening operation of the current smart magic cubes requires the user to rotate one of the faces to send the awakening trigger signal. However, in general, when the user of the smart magic cube rotates the smart magic cube, they are not thinking about for starting the smart magic cube, but thinking about for operating the smart magic cube to complete some scrambling or restoration actions. However, the current smart magic cubes need a certain amount of time to start each of the functional modules to enter the normal working mode from the dormant state in a process of waking up. During this period of time, the user's operation may not be detected and recorded by various sensors in the smart magic cube, which may bring the user an experience that the smart magic cube needs to be powered on and not smart enough.

Therefore, the present disclosure improves on the above problems and provides a method for waking up smart magic cube.

Figure 2:
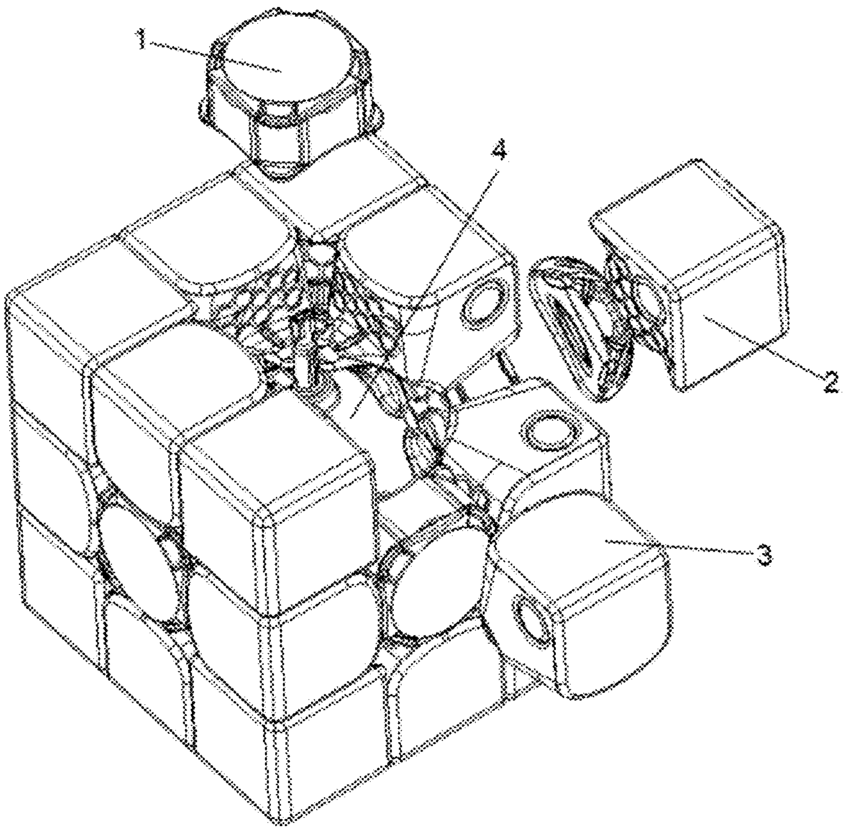
FIG. 2 is a structural schematic diagram of a first partly disassembled structure of the smart magic cube according to one embodiment of the present disclosure.
Figure 3:
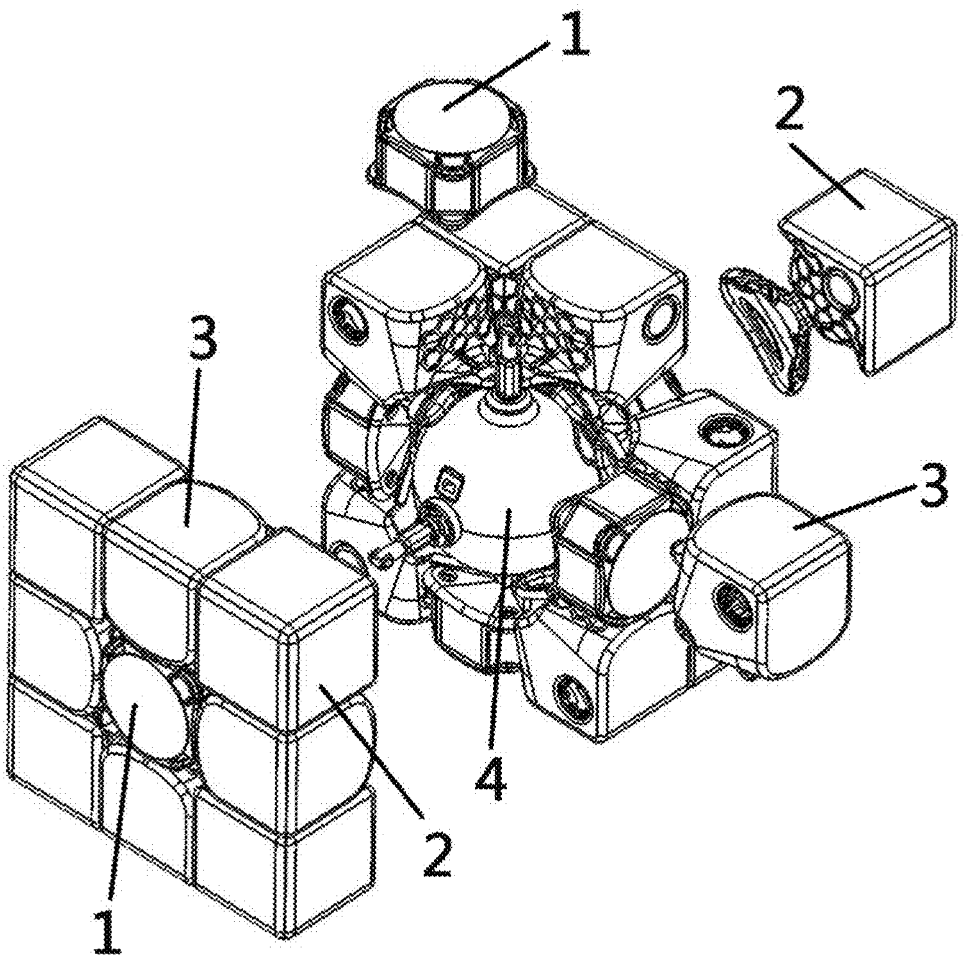
FIG. 3 is a structural schematic diagram of a second partly disassembled structure of the smart magic cube according to one embodiment of the present disclosure.

As shown in FIG. 1, FIG. 2, and FIG. 3, the following takes a typical third-order smart magic cube as an example to describe a smart magic cube provided by the embodiments of the present disclosure in detail. In one embodiment, the smart magic cube includes six faces, each of the six faces includes nine magic cubes, and the six faces include six central blocks 1, eight corner blocks 2, and twelve edge blocks 3, magic cubes of which are totally numbered in twenty-six. The smart magic cube further includes a ball shaft 4. The ball shaft 4 is located at a center position and acts as a rotation center. In one embodiment, the six central blocks 1 are arranged on a rotation axis of each face, and the six central blocks 1 serve as the rotation center of each face of the smart cub, and a position of the six central blocks 1 remains unchanged, and only one face has a color or a pattern. The twelve edge blocks 3 each is one magic cube embedded between any two central blocks 1, and the twelve edge blocks 3 each has two faces composed of different colors or patterns. Every adjacent three of the twelve edge blocks are connected by one of the eight corner blocks 2. An initial state of the smart magic cube is that each face has a different color, but a same face has the same color. Of course, each face can also be distinguished by setting different patterns. A gameplay of the smart magic cube is to scramble the magic cubes on each face, so that each face may contain different colors or patterns, and finally each face needs to be restored to corresponding original state.

Figure 4:
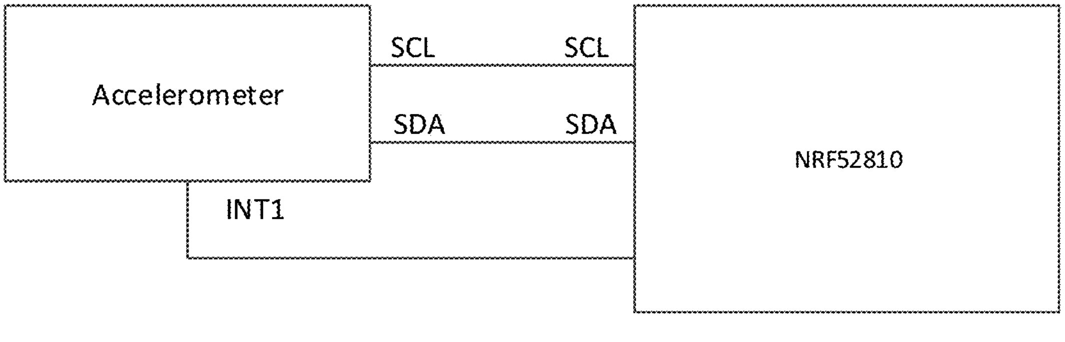
FIG. 4 is a schematic diagram of a connection between an accelerometer and a chip according to one embodiment of the present disclosure.
Figure 5:
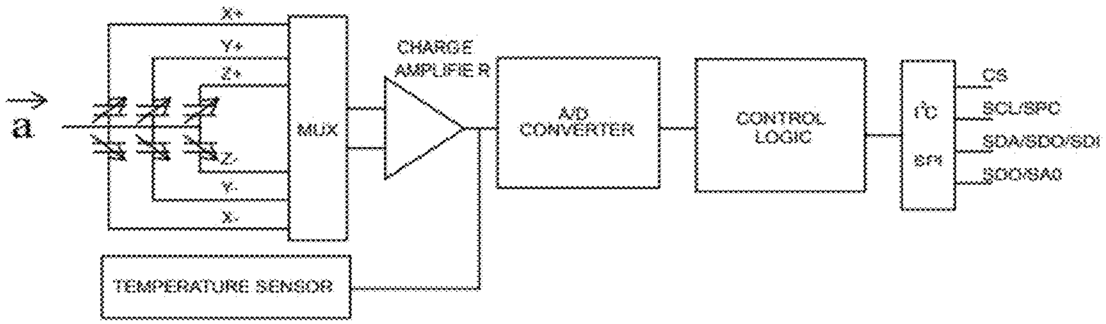
FIG. 5 is a structural schematic diagram of an inner portion of the accelerometer according to one embodiment of the present disclosure.

In the smart magic cube of the preset disclosure, a micro control unit, an accelerometer, an HP filter, a wireless communication module, and a battery module are arranged inside the ball shaft 4. The battery module provides power for various functional components such as the micro control unit, the accelerometer, the HP filter, and the wireless communication module. The accelerometer is connected to the micro control unit by the HP filter, and the micro control unit is connected to the wireless communication module. In the embodiment of the present disclosure, the ball shaft is not limited to the above-mentioned components, and may also include other sensors for improving the functions of the smart magic cube, such as sensors for sensing a rotation action and rotation angle of each face of the smart magic cube. In one embodiment, FIG. 4 illustrates a schematic diagram of an exemplary embodiment of a connection between an accelerometer and a chip. The accelerometer is configured to detect acceleration values of materials. At present, there are mature schemes to detect the acceleration values of objects in three directions, which have mature applications in aircraft, unmanned aerial vehicles, intelligent terminals, intelligent processing and manufacturing equipment, etc. One embodiment of the present disclosure uses a lis2dw12 accelerometer to detect the acceleration values in three directions of the smart magic cube including an X-axis, a Y-axis, and a Z-axis. A structure diagram illustrating an inner structure of the accelerometer provided in present disclosure is shown in FIG. 5.

Figure 6:
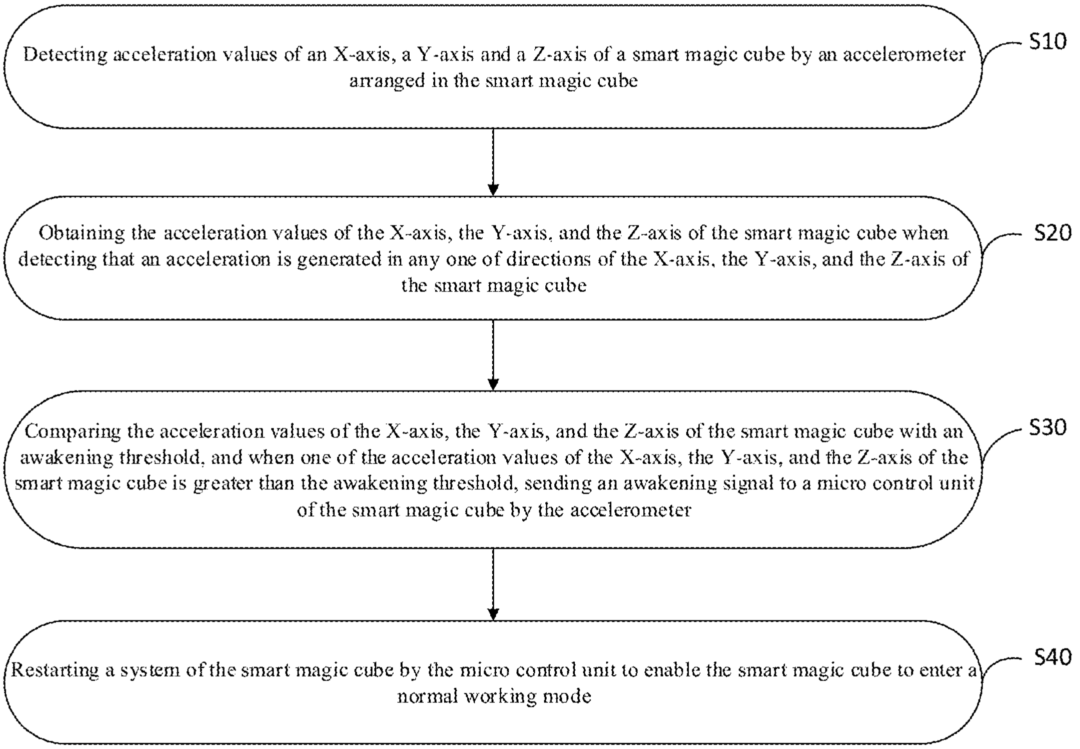
FIG. 6 is a flowchart of a method for waking up smart magic cube according to one embodiment of the present disclosure.

Referring to FIG. 6, one embodiment of a method for waking up smart magic cube is illustrated. The method includes following steps.

At step S10, the acceleration values of the X-axis, the Y-axis and the Z-axis of the smart magic cube are detected by the accelerometer arranged in the smart magic cube.

At step S20, the acceleration values are obtained when detecting that the acceleration is generated in any axis direction of the smart magic cube.

At step S30, the acceleration values are compared with a preset awakening threshold, and when one of the acceleration values is greater than the awakening threshold, an awakening signal is sent to a micro control unit of the smart magic cube by the accelerometer.

At step S40, the micro control unit restarts the smart magic cube to enable the smart magic cube to enter the normal working mode.

The method for waking up smart magic cube provided by the embodiment of the present disclosure is to detect the acceleration values of the smart magic cube in three axis directions by arranging an accelerometer in a ball axis of the smart magic cube, and when the smart magic cube enters the dormancy state. When any of the acceleration values reaches the threshold, it means that the smart magic cube will be used and needs to enter the normal working mode to record the states of the smart magic cube. Then, the awakening signal is sent to a micro control unit (MCU), and the smart magic cube enters the normal working mode by a MCU control system, that is, all functional modules in the smart magic cube are controlled to enter the working mode. At this time, any operation information on the smart magic cube may be recorded in time and uploaded to a terminal device connected to the smart magic cube. When the smart magic cube is in the dormancy state, a battery in the smart magic cube only needs to provide a working power to the accelerometer, and the MCU only needs to monitor an interrupt and introduce an interface state. Other modules of the smart magic cube can enter the dormancy state or even close state without using power of the battery, which can greatly reduce an energy consumption of the smart magic cube in the dormancy state and increase a working time of the battery. Using the method provided in present disclosure, a button battery can provide three years of use of the smart magic cube without any other use, thus improving user's using experience. At the same time, when the user picks up the smart magic cube, which makes the smart magic cube produce an acceleration, it usually takes a certain time for the user to rotate and use the smart magic cube, during a period of the certain time, the MCU has enough time to enter the normal working mode. At this time, when the user rotates the smart magic cube, all kinds of sensors arranged in the smart magic cube enter the normal working mode, which can detect and record the user's operation normally, thus enabling the user to generate an experience that the smart magic cube can intelligently record user's operation at any time, increasing user's operating experience.

In one preferred embodiment of the method for waking up smart magic cube provided in the present disclosure, step S30 specifically following detail steps.

At step 31, a timer is started when determining that the acceleration value is greater than the awakening threshold; and obtained acceleration value is continuously compared with the awakening threshold.

At step 32, when the acceleration value continuously obtained within a preset timing time timed by the timer is greater than the awakening threshold, the awakening signal is sent to the MCU.

In further research, the inventor found that the method for waking up smart magic cube provided in the present disclosure is configured to wake up the smart magic cube, there are some cases of false awakening, which led to the smart magic cube still being wakened without awakening, making the smart magic cube enter the normal working mode, and there is also a waste of battery power. By analysis, it is found that the above situation is mainly caused by some sudden vibrations, which makes the smart magic cube suddenly produce a large acceleration value in a certain direction, even far beyond the awakening threshold. However, in daily life, most of these vibrations are not continuous, that is, large vibrations suddenly produce, but soon disappear. If the user picks up the smart magic cube and operates it, the acceleration generated is continuous. Therefore, in one preferred embodiment of the present disclosure, when the accelerometer detects that the acceleration value of the smart magic cube is greater than the awakening threshold, the timer is started to count, and when the acceleration value is detected to be greater than the awakening threshold for a certain period of time, an interrupt pin may be enabled, and the MCU may wake up the smart magic cube by the interrupt pin.

In one embodiment, a realization method of making the smart magic cube enter the normal working mode is to restart a system of the smart magic cube by the micro control unit. In one preferred embodiment, a firmware system is restarted, that is, after step S40, the method further includes following steps.

At step S50, a firmware program of the smart magic cube is started, and the accelerometer is started.

At step S51, an output data rate of the accelerometer is configured.

At step S52, a range of the accelerometer is configured.

At step S53, an X offset, a Y offset, and a Z offset of the accelerometer are configured.

At step S54, the awakening threshold is configured.

At step S55, an awakening interrupt is configured to drive the interrupt pin.

At step S56, when the smart magic cube enters a dormancy mode, step S10 is executed.

Figure 7:
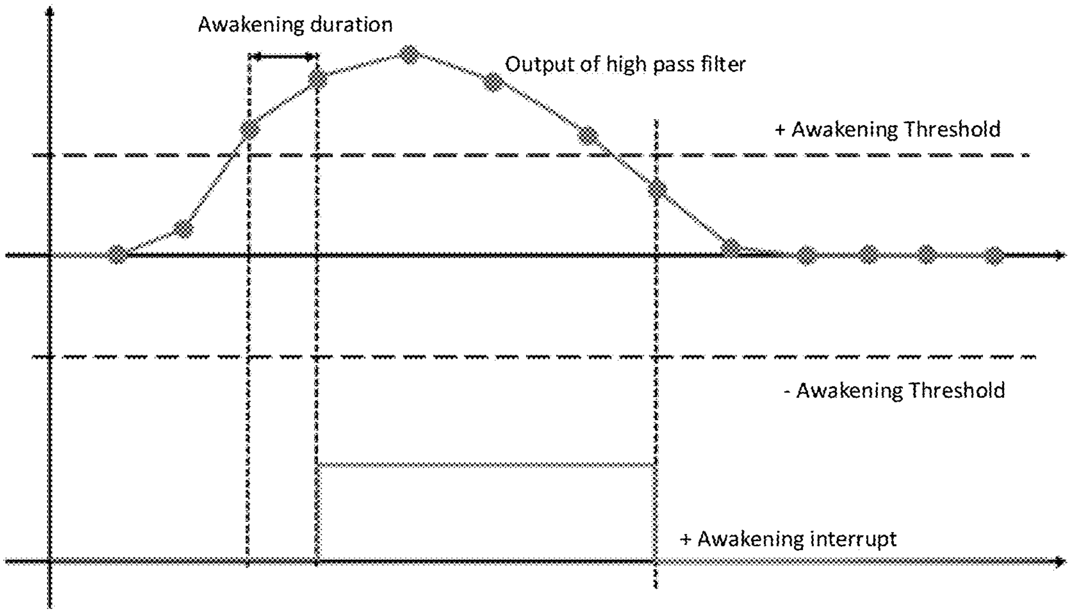
FIG. 7 is a schematic diagram of detecting the accelerometer in the method for waking up smart magic cube according to one embodiment of the present disclosure.
Figure 8:
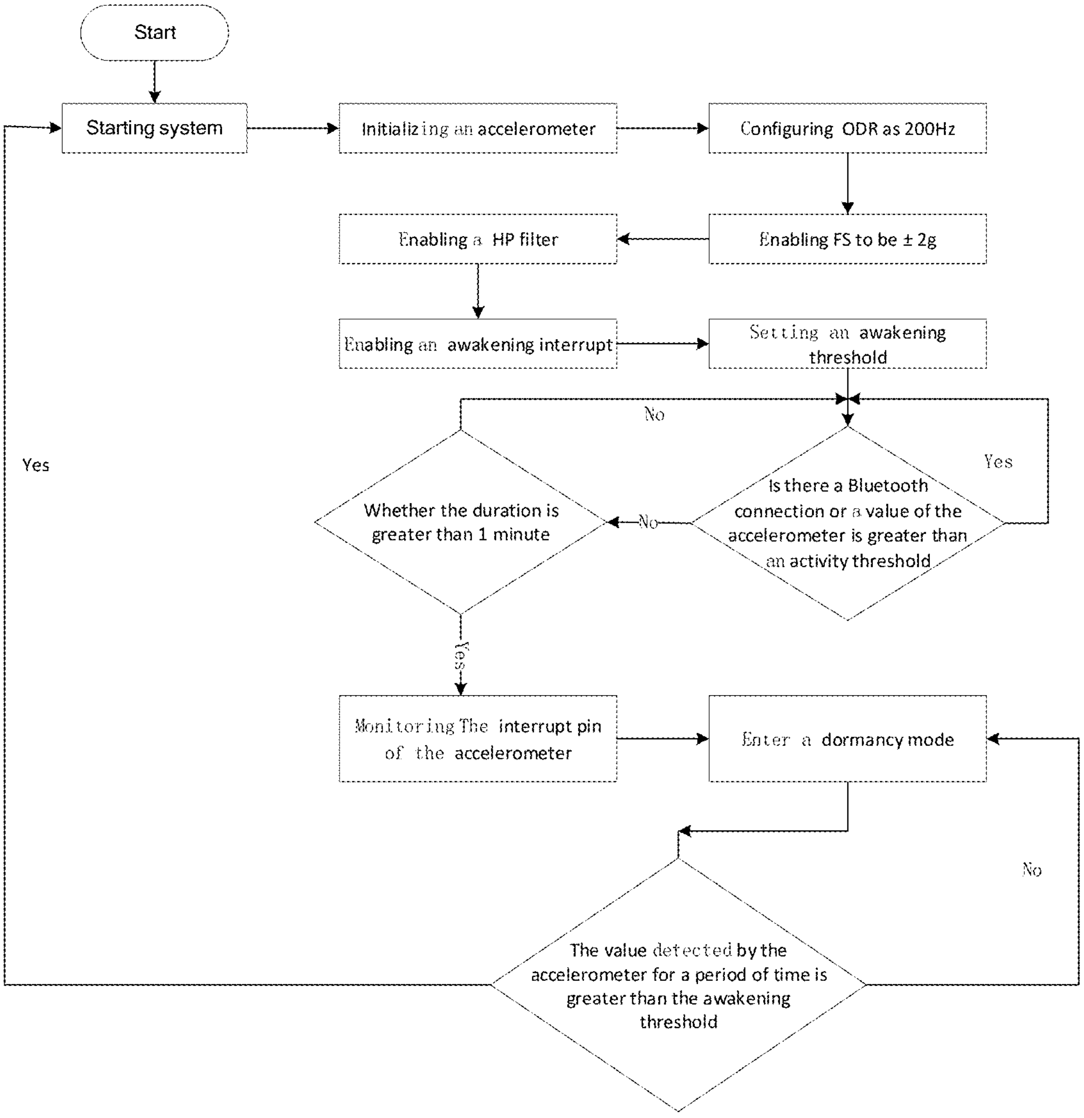
FIG. 8 is a detailed flowchart of the method for waking up smart magic cube according to one embodiment of the present disclosure.

For a design and an implementation of software, one embodiment of the present disclosure realizes an awakening procedure for event recognition by using an HP filter. As shown in FIG. 7 and FIG. 8, a basic process of the awakening procedure includes follow steps:

- starting the firmware program;
- starting and initializing the accelerometer;
- configuring the output data rate of the accelerometer (ODR) of the accelerometer as 200 Hz, and configuring a mode of the output data rate of the accelerometer as a high performance mode;
- enabling a range of the accelerometer (FS) to be ±2 g, and configuring the mode of the accelerometer as LOW_NOISE (low noise) mode;
- enabling the HP filter, and enabling interrupts;
- configuring an X offset value, a Y offset value, a Z offset value of the accelerometer;

setting the awakening threshold of the accelerometer; where a setting value of the awakening threshold can be set according to test data. In one embodiment of the present disclosure, the awakening threshold is set as 62.5 mg (equal to 2*FS/64).

The awakening interrupt is configured to drive the interrupt pin (pin 1) of an accelerometer chip. At this time, the smart magic cube has entered the normal working mode, and the functional modules of the smart magic cube, such as sensors, wireless communication modules, MCUs, etc., have entered the normal working mode.

When the smart magic cube is in the normal working mode, the MCU detects in real time to determine whether the smart magic cube is in an idle state, so as to enter the dormancy mode when the smart magic cube is in the idle state, thereby saving battery power. The smart magic cube determines whether it needs to enter the dormancy mode by the following methods.

The MCU detects whether the smart magic cube is connected to the terminal device. There are generally two states, when the smart magic cube needs to enter the normal working mode. One state is that the user connects to the smart magic cube by a smart terminal (such as a smartphone, a tablet, etc.) and obtains data of the smart magic cube, or operates the smart magic cube by a mobile phone, such as setting the smart magic cube, etc. The other state is that the user rotates the smart magic cube to operate the smart magic cube.

In one preferred embodiment provided by the present disclosure, the MCU monitors the wireless communication module in real time. When the wireless communication module does is not connected to any smart terminal, it is determined that the smart magic cube may be in the idle state. At this time, the MCU reads the acceleration value of the accelerometer. When the acceleration value of the smart magic cube is greater than an activity threshold, it means that the smart magic cube is being operated, and the smart magic cube is kept in the normal working state. When it is detected that the acceleration value of the smart magic cube is less than the activity threshold, it means that the smart magic cube has not been operated, and the smart magic cube is in the idle state. The smart magic cube can be driven into the dormancy mode, so that most of the functional modules of the smart magic cube are turned off or in a low power consumption state.

In a preferred embodiment provided by the present disclosure, when it is detected that the smart magic cube is not connected to the terminal device, and the acceleration value of any one axis of a three-axis accelerometer detected by the smart magic cube is less than the activity threshold, the timer can be started to count, and a connection status of the wireless communication module and the acceleration value of the accelerometer are detected continuously. When a preset timing time is exceeded, the smart magic cube is controlled to enter the dormancy mode, and when the wireless communication module or the acceleration value does not meet dormancy conditions at any time, the normal working mode of the smart magic cube is maintained, the smart magic cube is rested, thus avoiding frequent hibernation and restart of the smart magic when the user takes a short break. The time setting of the timer can be set according to needs or statistical data, such as setting one minute. By statistics, if it is found that the smart magic cube is often wakened up within two minutes of dormancy, the timer can be set to two minutes. The activity threshold of the smart magic cube can be set as needed, and it can be the same as the awakening threshold or different from the awakening threshold.

When the smart magic cube enters the dormancy mode, the system of the smart magic cube enters an awakening detection state, that is, the smart magic in the embodiment of the present disclosure is configured to perform the awakening operation. When the value detected by the accelerometer is greater than the awakening threshold for a continuous period of time, that is, when a difference between a detected data detected for a preset period of time and a value of a register configuration exceeds a configured threshold, each X data, Y data, and Z data in the three-axis accelerometer will generate an awakening interrupt signal. The WU_THS fields of a WAKE_UP_THS register is set to 000010b, so the awakening threshold is 62.5 mg (equal to 2*FS/64), a device (namely smart magic cube) is wakened up and the program runs normally. The continuous period of time may be set as needed, such as being set to 2 seconds. The time cannot be set too short, if it is too short, an effect of timer timing will not be achieved, and it cannot be too long, if it is too long, the smart magic cube has not yet entered the normal working mode when the user operates the smart magic cube.

The present disclosure judges posture states of the smart magic cube by obtaining the values of the X-axis, the Y-axis, and the Z-axis of the accelerometer, thereby realizing the function of picking up the smart magic cube to wake up the smart magic cube, and giving the user an imperceptible start-up mode, making a design of the smart magic cube more humanized. Further, by an awakening way of the present disclosure, only one IO port of the interrupt pin of the accelerometer needs to be interrupted and monitored. Compared with a way of an existing technology that the smart magic cube monitors the IO ports of each face in the dormancy state, the awakening way of the present disclosure reduces an interrupt monitoring of the IO ports when the smart magic cube is in the dormancy mode, thus greatly reducing the power consumption of the smart magic cube in the dormancy sleep mode. In the present disclosure, the smart magic cube is configured in following way. The smart magic cube may run for up to three years in a dormant state with using only one 140 mAh button battery.

Figure 9A:
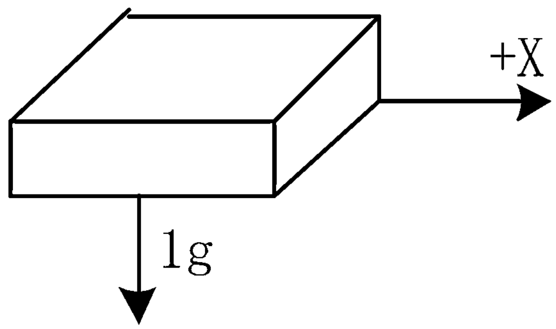
FIG. 9A is a schematic diagram of obtaining a first posture state of the smart magic cube through the accelerometer by a three-axis acceleration according to one embodiment of the present disclosure.
Figure 9B:
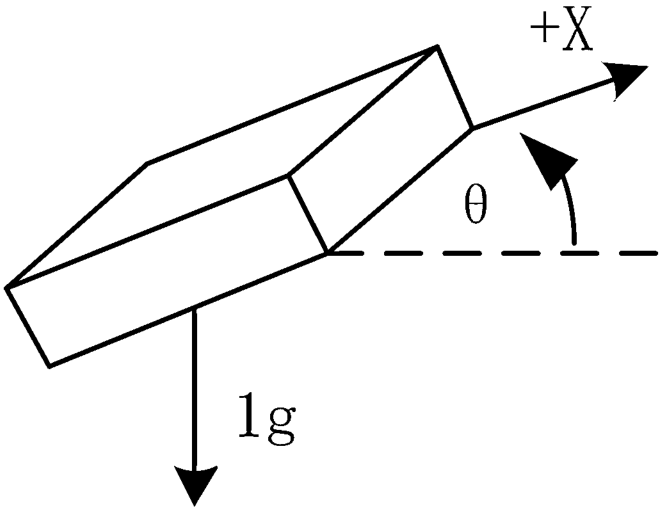
FIG. 9B is a schematic diagram of obtaining a second posture state of the smart magic cube through the accelerometer by the three-axis acceleration according to one embodiment of the present disclosure.

The smart magic cube provided by the present disclosure can determine a posture state of the smart magic cube by the three-axis acceleration when the smart magic cube is in the normal working mode under a condition of using the accelerometer. A realization principle of the smart magic cube determining the posture state will be described below in conjunction with FIG. 9A and FIG. 9B.

The X-axis on the accelerometer chip is aligned to a front, by making the Y-axis left, and the Z-axis up, a right-hand rule is used, and the user's thumb respectively point to positive directions of an X-axis, a Y-axis, and a Z-axis of a gyroscope, and a direction angle of the user's four fingers is positive. A pitch angle is calculated according to a first formula $\theta = a\sin(-ax)\theta = a\sin(-ax)$, and a horizontal roll angle is calculated according to a second formula $\phi = a\tan(ay/az)$.

When the accelerometer is placed horizontally, that is, when the Z-axis is vertically upward, a value of 1 g (g is the acceleration value of gravity) can be read from the Z-axis, and 0 can be read from the X-axis and Y-axis can read 0, which can be recorded as (0, 0, g). It can be known that an inclination angle is always an absolute data generated with reference to the gravity, for example, the inclination angle shown in FIG. 9B.

In a preferred embodiment of the present disclosure, the posture state of the smart magic cube can be further determined by the three-axis acceleration.

The inventor of the present disclosure found that there is a problem of complex structure when assembling the smart magic cube. At the same time, in a process of assembling the smart magic cube, required process is strict. In a process of connecting the PCB boards arranged on six faces, on the one hand, it is necessary to adjust the PCB boards to ensure that the PCB boards are perpendicular to each other, and at the same time, the connection between the PCB boards needs to be soldered, and solder joints are small and have a large quantity.

By carefully analyzing the existing problems of the existing smart magic cube, the inventor of the present disclosure creatively further improves the sensing device and a ball shaft of the smart magic cube, thereby greatly simplifying a structure of the sensing device used for the smart magic cube. On the one hand, due to a large reduction in the use of the PCB boards, a cost of materials can be greatly reduced. On the other hand, a process complexity required for assembly is greatly reduced, an efficiency of assembling and processing the smart magic cube is improved, and a production cost is reduced.

Figure 10:
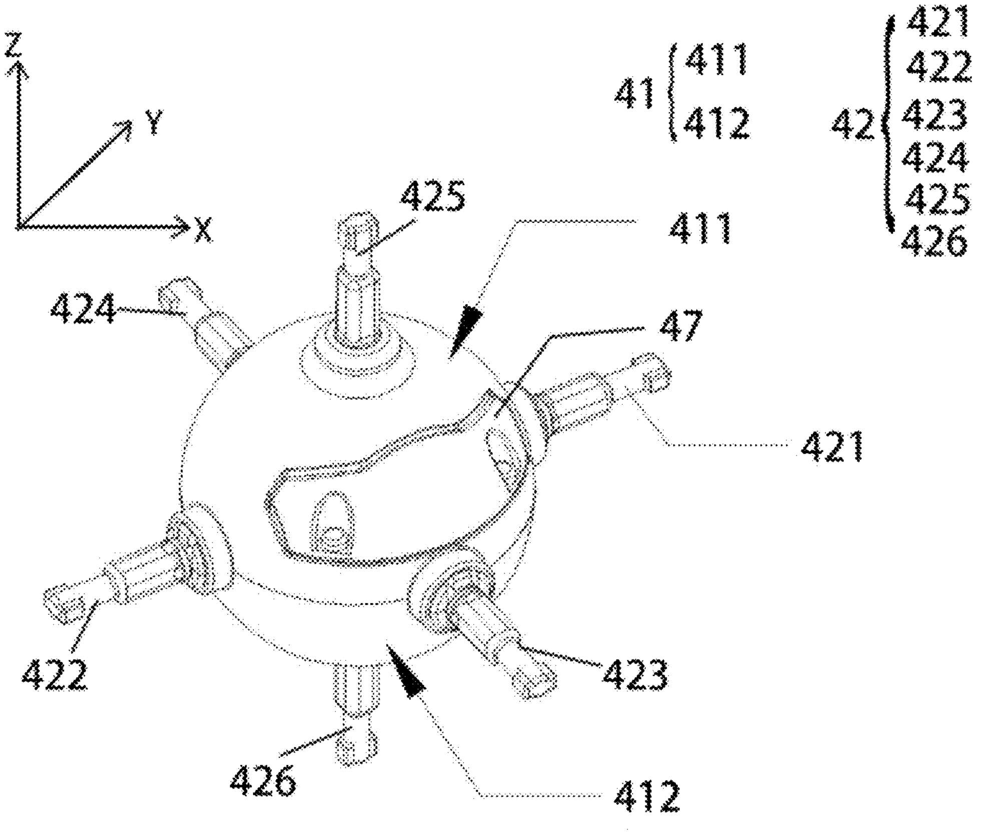
FIG. 10 is an overall structural schematic diagram of a ball shaft according to one embodiment of the present disclosure.
Figure 11:
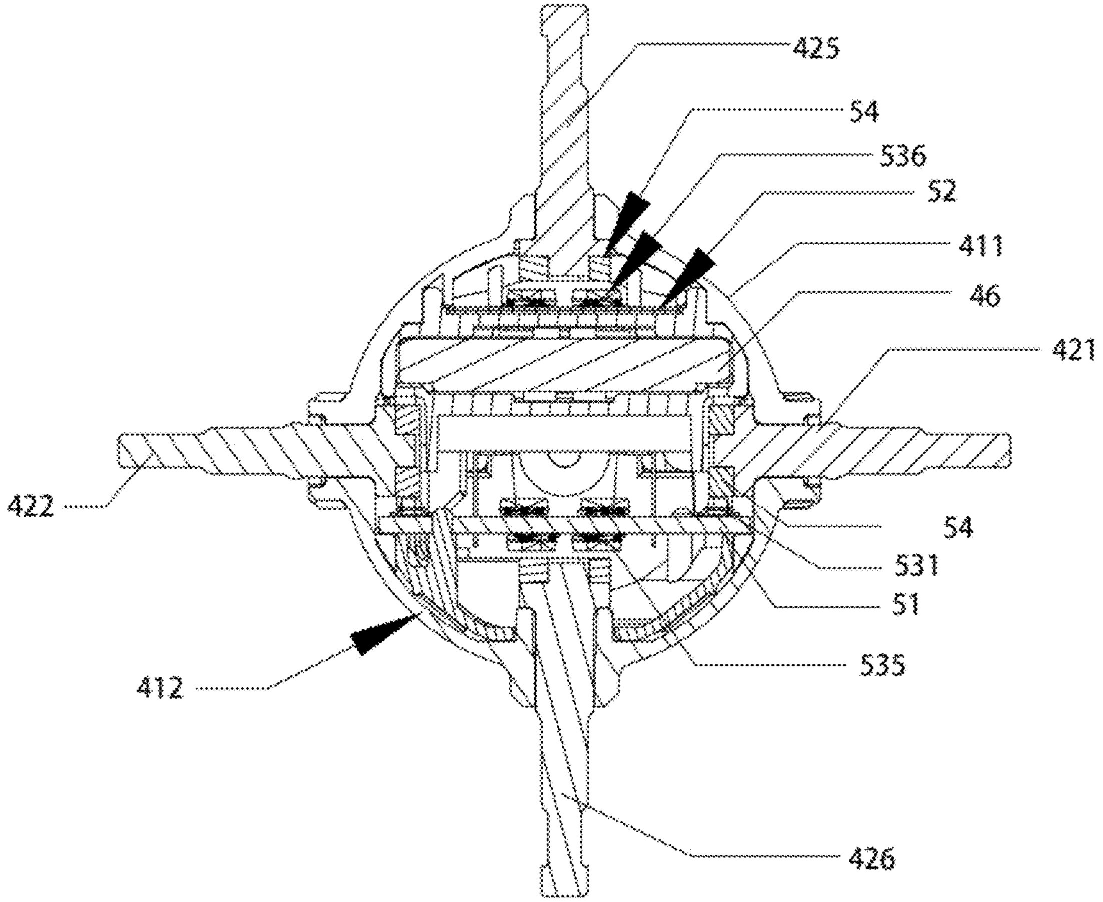
FIG. 11 is a sectional schematic diagram of the ball shaft according to one embodiment of the present disclosure.

As shown in FIG. 2 and FIG. 3, combined with FIG. 10 and FIG. 11, the smart magic cube of the present disclosure has made important improvements to a structure of the ball shaft. In one embodiment of the present disclosure, the ball shaft 4 includes a ball shaft housing 41, and the ball shaft housing 41 includes an upper half housing 411 and a lower half housing 412. The upper half housing 411 and the lower half housing 412 are detachably connected, for example, the upper half housing 411 and the lower half housing 412 are detachably connected by screws, buckles, etc. By a detachable connection between the upper half housing 411 and the lower half housing 412, a sensing device 5 can be built into a second accommodation space 44 formed inside the ball shaft housing 41.

On the ball shaft housing 41, a three-dimensional coordinate system is built by setting a spherical center of the ball shaft housing 41 as an origin, as shown in FIG. 10 (FIG. 10 schematically moves the three-dimension coordinate system outside the ball shaft to avoid influence on various parts), setting a right rotating shaft 421 in a positive direction of an X-axis, setting a left rotating shaft 422 in a negative direction of the X-axis, setting a front rotating shaft 423 in a negative direction of a Y-axis, setting a rear rotating shaft 424 in a positive direction of the Y-axis, setting a upper rotating shaft 425 in a positive direction of a Z-axis, and setting a lower rotating shaft 426 in a negative direction of the Z-axis. A positioning module 54 is arranged on each of rotating shafts 42, and the positioning module 54 rotates with corresponding rotating shaft 42. The second accommodation space 44 for accommodating the sensing device 5 is set inside the ball shaft housing 41. A battery compartment 45 is set in the second accommodation space 44, and a battery 46 may be arranged in the battery compartment 45. In one embodiment of the present disclosure, the battery 46 is a button battery, specifically a CR2032 button battery. The battery can work for 10 hours, and a standby time of the battery can reach one year without using the smart magic cube, which may meet usage scenarios of the smart magic cube. A battery cover 47 is arranged on the upper half housing 411 of the ball shaft housing 41, and the battery cover 47 is detachably mounted on the upper half housing 411. By opening the battery cover 47, it is convenient and better to replace the battery.

Figure 12:
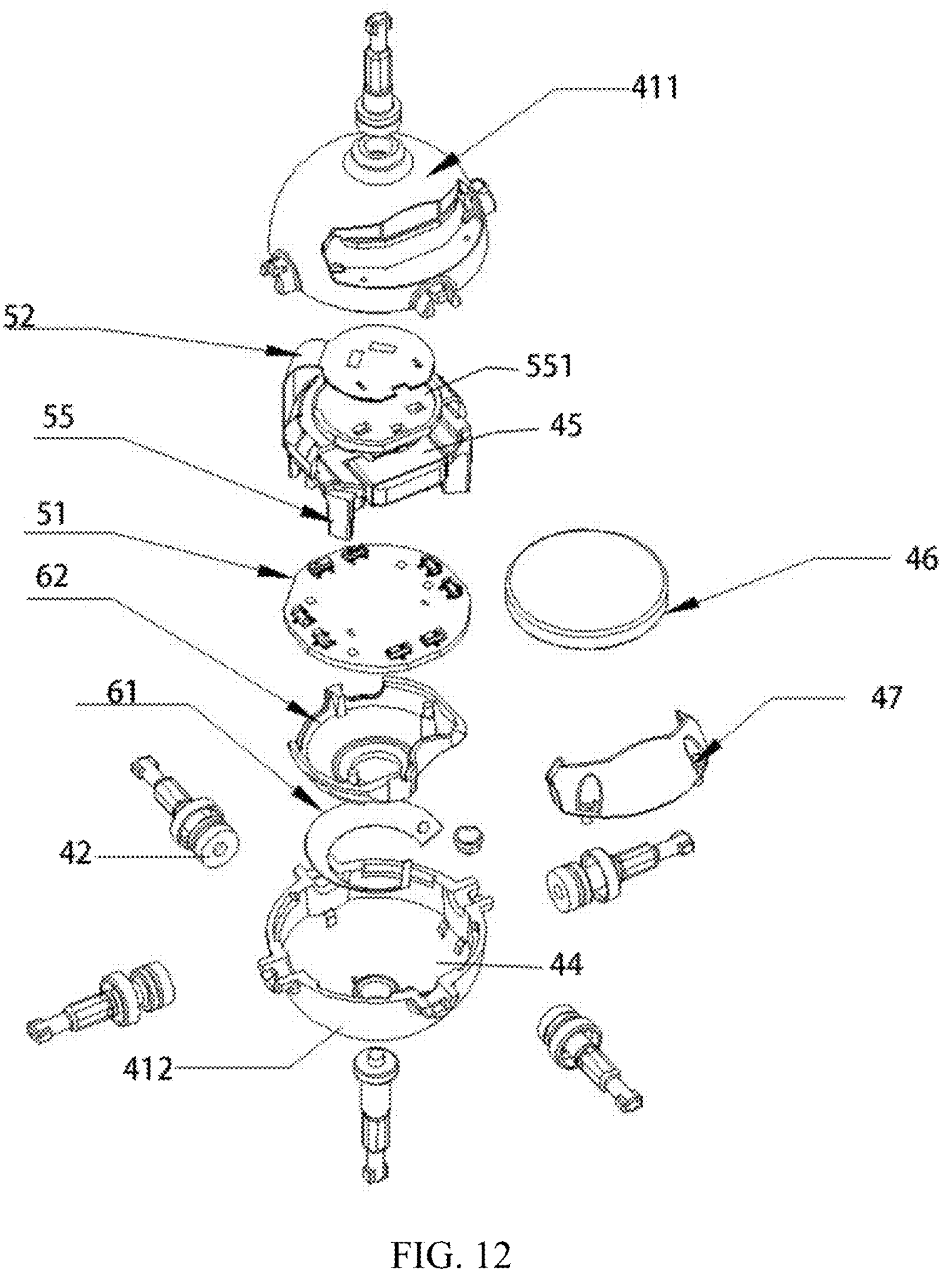
FIG. 12 is an exploded structural schematic diagram of the ball shaft according to one embodiment of the present disclosure.
Figure 13A:
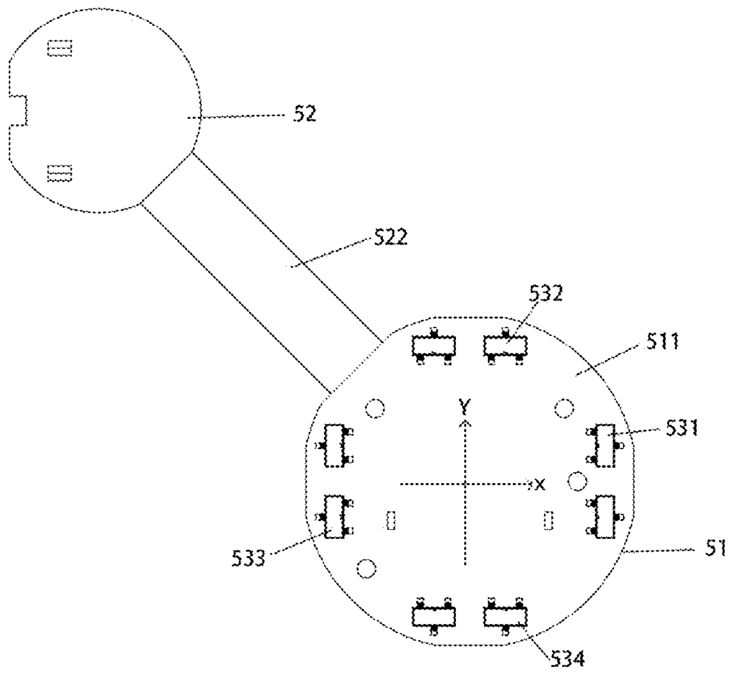
FIG. 13A is a structural schematic diagram of a sensing device according to a first embodiment of the present disclosure.
Figure 13B:
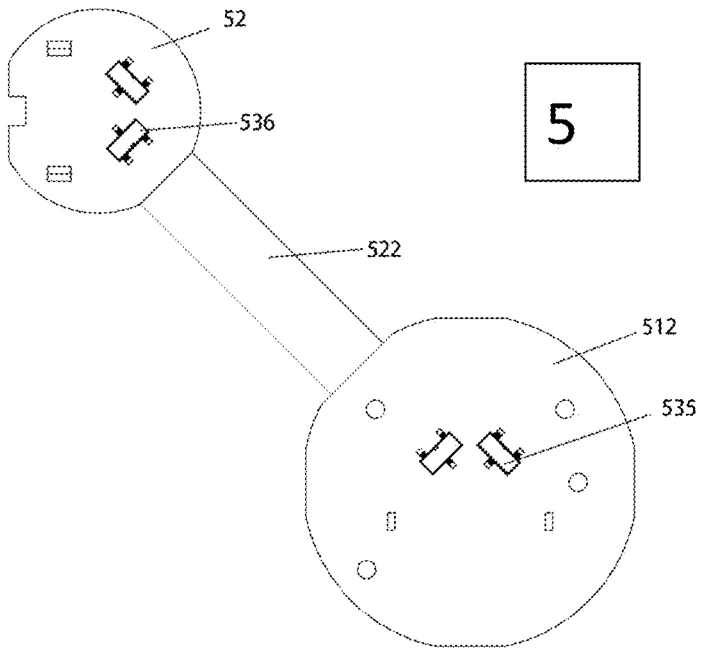
FIG. 13B is a structural schematic diagram of the sensing device according to a second embodiment of the present disclosure.
Figure 13C:
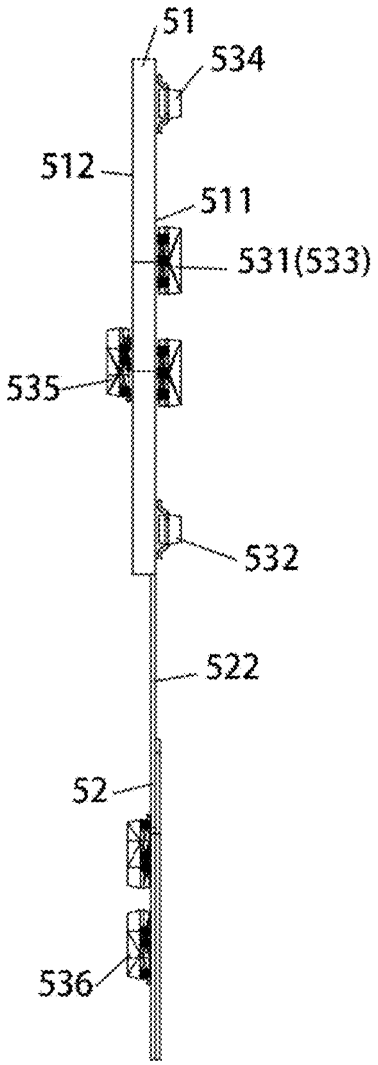
FIG. 13C is a structural schematic diagram of the sensing device according to a third embodiment of the present disclosure.

In one embodiment of the present disclosure, in each direction of the rotating shafts of the ball shaft housing 41, an installation hole of the rotating shaft is defined (as shown in FIG. 11 and FIG. 12). A lower half part of each of the rotating shafts 42 defines an insertion part, each of the rotating shafts is assembled with the ball shaft housing by inserting the insertion part into the installation hole. A connection mode between the insertion part and the ball shaft housing can be a buckle connection or a screw connection, which is not limited here. In one embodiment of the present disclosure, the installation hole with respect to the upper rotating shaft 425 is defined on the upper half housing 411, and the installation hole with respect to the lower rotating shaft 426 is defined on the lower half housing 412. The installation holes of the left rotating shaft 422, the right rotating shaft 421, the front rotating shaft 423, and the rear rotating shaft 424 are divided into two parts, one half of the two parts is arranged on the upper half housing 411, and the other half of the two parts is arranged on the lower half housing 412. The above setting structure achieves a more balanced in all directions on the whole, which is conducive to hold and operate the smart magic cube.

As shown in FIG. 11, FIG. 12, FIG. 13A and FIG. 13B, in one embodiment of the present disclosure, the ball shaft for the smart magic cube includes a sensing device 5 arranged in the second accommodation space 44 inside the ball shaft housing 41. The sensing device 5 includes a master circuit board 51 and a slave circuit board 52. In one embodiment, the master circuit board 51 defines a micro control unit (not shown in the drawings), and the master circuit board 51 includes a first circuit board 511 and a second circuit board 512. The first circuit board 511 is arranged on a front side of the master circuit board 51, and the second circuit board 511 is arranged on a reverse side of the master circuit board 51. A plane rectangular coordinate system is built by setting a center of the first circuit board 511 as an origin, a positive direction of an X-axis as a first direction, a negative direction of the X-axis as a third direction, and a positive direction of a Y-axis as a second direction, and a negative direction of the Y-axis as a fourth direction. A first electronic sensing element 531, a second electronic sensing element 532, a third electronic sensing element 533, and a fourth electronic sensing element 534 are correspondingly arranged in each of the directions. A fifth electronic sensing element 535 is arranged in a central area of the second circuit board 512. Each of the electronic sensing elements communicates with the micro control unit. The slave circuit board 52 is arranged on a preset plane parallel to the first circuit board 511, and the preset plane and the second circuit board 512 are separated on both sides of the first circuit board 511, and the slave circuit board 52 defines a sixth electronic sensing element 536, and the sixth electronic sensing element 536 communicates with the micro control unit.

In one embodiment of the present disclosure, the sensing device 5 further includes a first positioning module, a second positioning module, a third positioning module, a fourth positioning module, a fifth positioning module and a sixth positioning module respectively arranged on the six rotating shafts of the smart magic cube. Each of the electronic sensing elements is respectively inductively positioned with the positioning module 54 in corresponding direction. In one embodiment of the present disclosure, the electronic sensing element is a magnetic sensor, and the magnetic sensor, includes but is not limited to one of Hall elements, tunneling magnetoresistance (TMR), anisotropic magnetoresistance (AMR), giant magnetoresistance (GMR) or Various combinations. The positioning module 54 is a magnetic positioning module. In the sensing device of the present disclosure, the master circuit board is arranged on the ball shaft of the smart magic cube and located at the center of the smart magic cube. Therefore, the magnetic sensor as an electronic sensing element is also arranged at the center of the smart magic cube, and a magnetic positioning module is arranged on the rotating shaft. When the magnetic positioning module arranged on the rotating shaft, such as a magnet, rotates, a direction of the magnetic field on the magnet will also rotate as a whole. At this time, a relationship between the direction of the magnetic field and the magnetic sensor changes, which will cause an induced electromotive force of the magnetic sensor or an induced current of the magnetic sensor changes. A change of the induced electromotive force or the induced current is transmitted to the micro control unit, and the micro control unit can determine a rotation angle of the ball shaft according to the change and a trend of the induced electromotive force or the induced current.

Figure 14:
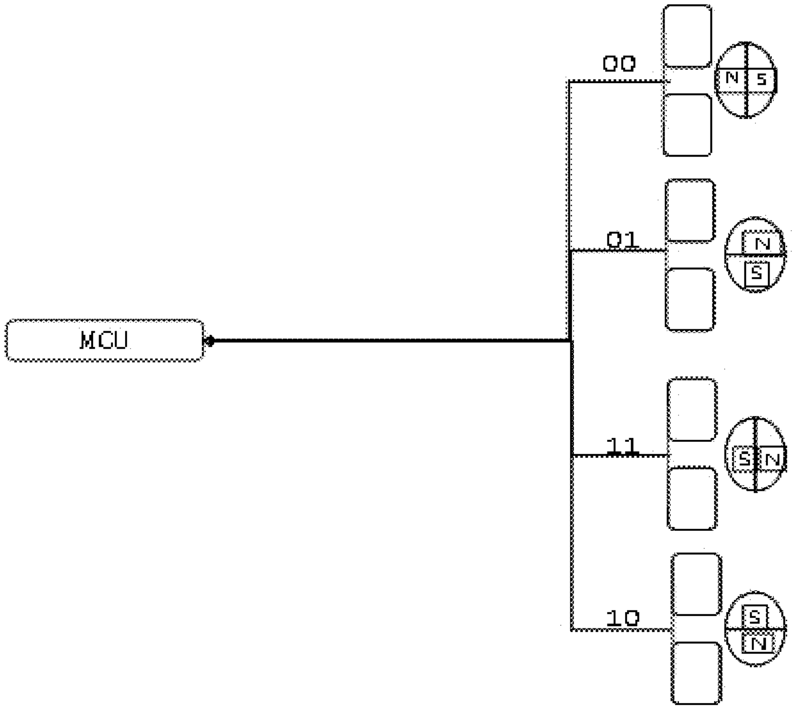
FIG. 14 is a schematic diagram of a connection state of a micro control unit, sensing elements, and magnetic positioning units according to one embodiment of the present disclosure.
Figure 15:
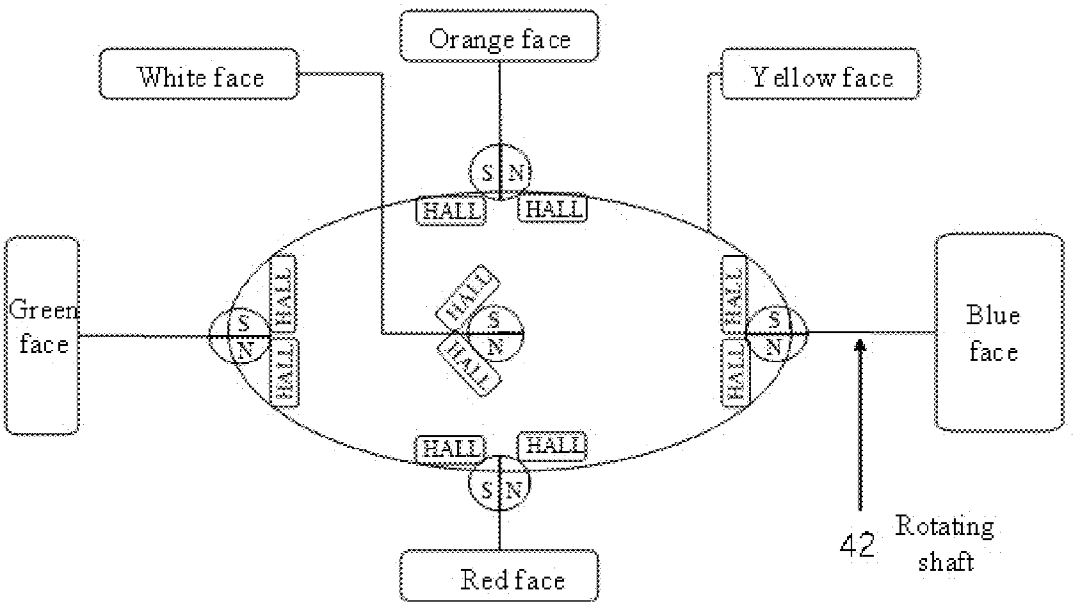
FIG. 15 is a schematic diagram of a corresponding connection between Hall sensors and magnets configured on each face of the smart magic cube.
Figure 16:
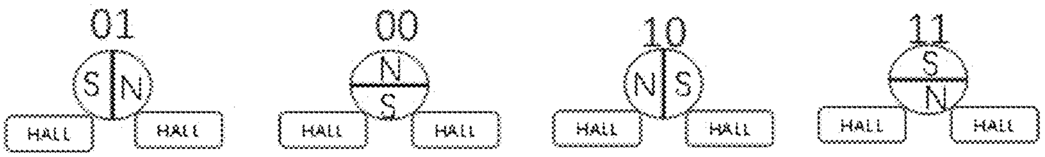
FIG. 16 is a schematic diagram of output values of the Hall sensors, taking one of faces of the smart magic cube rotating as an example to illustrate the output values

As shown in FIG. 13A to FIG. 13C and FIG. 14 to FIG. 17, the embodiment of the present disclosure is described by taking the electronic sensing element as a Hall sensor as an example. As shown in FIG. 14 and FIG. 15, two Hall sensors are arranged on the circuit board with respect to each direction of the rotating shaft. In one embodiment, the Hall sensor with a yellow face is arranged on a back side of FIG. 15, and a setting position of the Hall sensor with the yellow face corresponds to a white face, and is arranged on the second circuit board of master circuit board 51, and the Hall sensor with the white face is arranged on the slave circuit board 52. Two Hall sensors respectively detect the magnetic field direction on the magnetic positioning module on corresponding rotating shafts, and generate the induced current or the induced electromotive force according to the detected magnetic field direction and send the induced current or the induced electromotive force to the micro control unit (MCU). Therefore, after determining an initial state of the two Hall sensors corresponding to each face (the initial state of the Hall sensor is that an APP obtains a corresponding relationship between the Hall sensor and the magnet and determines a value when the state of the smart magic cube is input into the APP), subsequent rotation of the faces of the magic cube rotates at 90 degrees. Every time one face of the magic cube drives the magnet to rotate 90 degrees, each Hall sensor will output a signal of 0 or 1 to the MCU. Then a signal combination of the two Hall sensors has a total of four combined signals (00, 01, 10, 11), which respectively represent four different magnetic field directions of the magnet. Therefore, the MCU obtains the rotation angle of the magic cube according to the signal combination received from a pair of Hall sensors on corresponding shaft, and updates the status of the magic cube. As shown in FIG. 10, when the initial state of one face of the magic cube corresponds to a Hall value of 01, the face of the magic face rotates 90 degrees counterclockwise, and the Hall value is 00; the face of the magic face rotates 90 degrees clockwise, the Hall value is 11; and the face of the magic face rotates 180 degrees, the Hall value is 10. In the above-mentioned embodiments, a binary switch-type Hall sensor is used as an example for illustration. The technical solution provided by the embodiment of the present disclosure can also use a linear Hall element. When a linear Hall element is used as an inductive electronic element, any rotation angle information can be obtained after an output signal is converted by an analog-to-digital conversion (ADC), not limited to 90 degrees.

Figure 17:
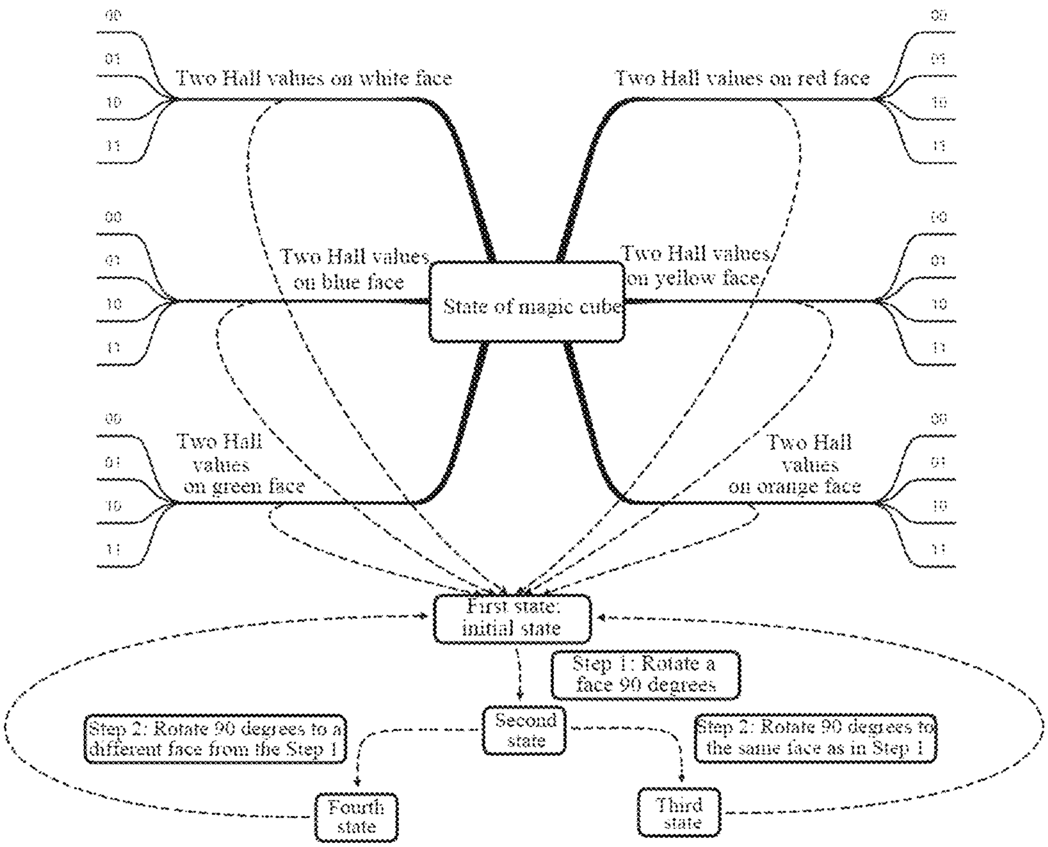
FIG. 17 is a schematic diagram of the rotation state of the smart magic cube and a working principle of the Hall sensors.

As shown in FIG. 17, when the initial state of each face of the magic cube is determined (that is, defined as a first state), according to a rotating face, the values of the two Hall sensors on corresponding face will change, for example when the white face rotate, a position relationship between the Hall sensor on the white face and the magnet on the corresponding face changes, and the Hall sensor on the white face generates a corresponding value and sends the value to the micro control unit. For the description of the position relationship between the value of the Hall sensor and the magnet, refer to above description of FIG. 16. At this time, the state of the face of the magic cube corresponds to a second state.

When continuing to rotate the face of the magic cube, there will be following two situations.

When continuing to rotate the face rotated in above first step, which rotating single face 180 degrees, here is a single face rotation mechanism: in the initial state of the single face, assuming that corresponding Hall value is 01, and the single face can be rotated freely. When a Tps speed is greater than a Hall speed, the Hall sensor cannot capture how many 90 degrees of rotation. As long as a speed of the magic cube drops and when the MCU can capture the Hall value, according to FIG. 16, according to the Hall value of the magic cube, a position of the single face is reversely calculated, so that the status of the magic cube is synchronized, which is a third state.

A different face from above step is rotated 90 degrees. In this step, the face is rotated by 90 degrees based on a change of the two Hall values of the corresponding face, and then a rotation direction of is determined based on an initial Hall value of the face in the second state and FIG. 16, which is a fourth state.

After the third state and the fourth state are updated, the third state and the fourth state are used as a newly initial state, and the above steps are repeated according to the rotation of each face with respect to the newly initial state.

In one embodiment of the present disclosure, as shown in FIG. 13A to FIG. 13C and FIG. 18, the master circuit board 51 and the slave circuit board 52 are composed of a same flexible printed circuit (FPC) board integrally connected. The master circuit board 51 connects to the slave circuit board 52 by a reserved long-stripped connection structure 522. The master circuit board 51 and the slave circuit board 52 can be processed on the same FPC board. A first Hall sensor, a second Hall sensor, a third Hall sensor and a fourth Hall sensor are arranged on the first circuit board 511 of the master circuit board 51, a fifth Hall sensor is arranged on the second circuit board 512, and another fifth Hall sensor is arranged on the slave circuit board 52 at the same time. Due to a flexibility of the FPC board, it is very convenient to change a position relationship between the master circuit board 51 and the slave circuit board 52, so that the master circuit board and the slave circuit board are able to be arranged at a preset position. The circuit connection between the master circuit board 51 and the slave circuit board 52 is realized by the long-stripped connection structure 522. Since the master circuit board 51 and the slave circuit board 52 are defined on the same FPC board, there is no need for any welding between the master circuit board 51 and the slave circuit board 52, which can reduce a welding process between different PCB boards in the prior art, and can effectively improve an assembly speed of the smart magic cube.

Figure 18:
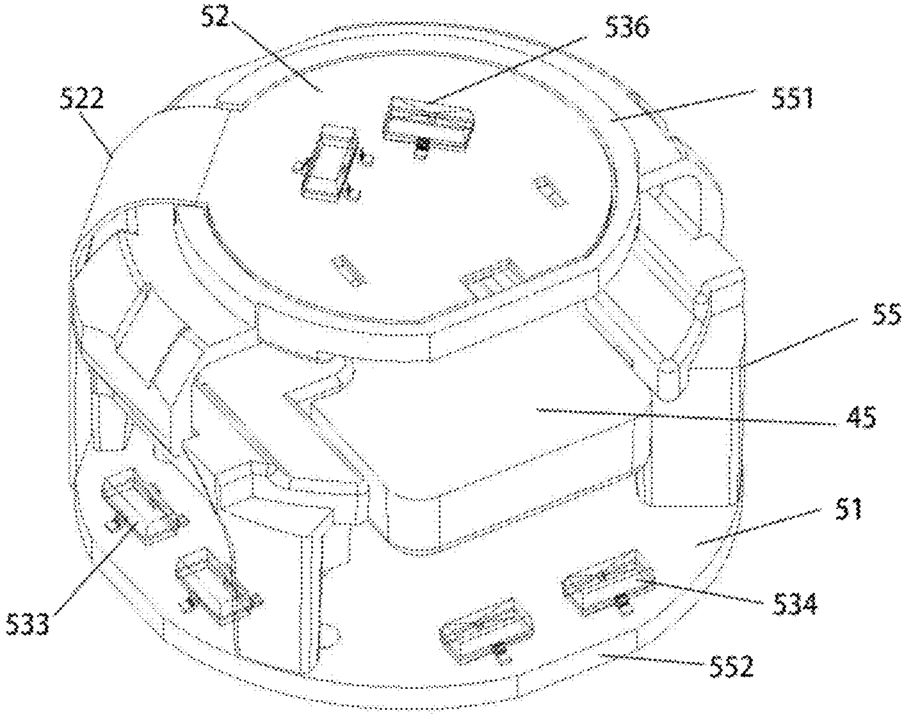
FIG. 18 is a structural schematic diagram of a circuit board fixing base combined with a circuit board according to one embodiment of the present disclosure.

In one embodiment, the same FPC board is used to form the master circuit board 51 and the slave circuit board 52, a preferred embodiment of the present disclosure further defines a circuit board fixing base 55. As shown in FIG. 18, a first fixing platform 551 is arranged on a top of the circuit board fixing base 55, and a second fixing platform 552 is arranged at a bottom of the circuit board fixing base 55, and the first fixing platform 551 is parallel to the second fixing platform 552. A first accommodation space is defined between the first fixing platform 551 and the second fixing platform 552, and a first part of the first accommodation space near the first fixing platform 551 defines the battery compartment 45 for accommodate the battery. A second part of the first accommodation space near the second fixing platform part defines an electronic component accommodation bin for accommodating electronic inductive elements. A through hole or a blind hole for accommodating the fifth electronic sensing element is arranged in a middle of the second fixing platform 552, the master circuit board 51 is fixed on the second fixing platform 522, and the slave circuit board 52 is fixed on the first fixing platform 551. A number of hollow parts are arranged between the first fixing platform 551 and the second fixing platform 552. In a case of ensuring a structural strength of the circuit board fixing base 55, by setting a hollow structure, on the one hand, the sensing device can be reduced, that is, a total weight of the ball shaft can be reduced, and on the other hand, an internal air flow can also be strengthened, so that heat generated by the battery can be reduced, and the heat generated by the battery is transferred to an outside of the magic cube.

The biggest advantage of using the same FPC board to form the master circuit board and the slave circuit board is that the two circuit boards are the same circuit board, so that the circuit connection between the two circuit boards does not require any soldering work. Therefore, the process complexity can be further reduced to achieve a better assembly effect.

However, due to a fact that a price of FPC materials is relatively expensive at present, with a development of technology and material technology in the future, a solution of using FPC boards may become ta mainstream trend, but there is still a problem of high cost at present. Therefore, this disclosure provides another embodiment.

In a second embodiment of the present disclosure, the master circuit board 51 adopts a hard PCB board, and the slave circuit board 52 adopts the FPC board. In the sensing device of the present disclosure, a main part is arranged on the master circuit board 51, and electronic induction element and the micro control unit are arranged on the master circuit board 51, therefore the main part adopts the PCB board with mature technology and relatively low price, and for the slave circuit board that needs to change a layout position and direction, the FPC board is used as the slave circuit board. The PCB board and the FPC board are connected by the long-stripped connection structure, and a fixation and a circuit connection between the two circuit boards are realized by welding between the PCB board and the strip connection structure.

Correspondingly, the present disclosure also defines a corresponding circuit board fixing base in a second embodiment of the second circuit board, and a first fixing platform is arranged on the top of the circuit board fixing base; a first accommodation space is defined between the first fixing platform and a bottom of the circuit board fixing base, and a first part of the first accommodation space near the first fixing platform defines the battery compartment for accommodating batteries, and a second part of the first accommodation space near the bottom of the circuit board fixing base defines an electronic component accommodation bin for accommodating the electronic inductive elements; the slave circuit board is fixed on the first fixing platform; and the master circuit board is fixed on the bottom of the circuit board fixing base, and the first fixing platform is parallel to the master circuit board. Compared with the circuit board fixing base of the first embodiment, the circuit board fixing base of the embodiment does not need to set a second fixing platform, because the PCB board is a straight hard board, which can fully withstand placement of various components on the PCB board and maintains a stable shape when the PCB board is fixed on the circuit board fixing base.

In another embodiment of the present disclosure, as shown in FIG. 18, under the circuit board fixing base 55, that is, at the bottom of the PCB board or the second fixing platform 552, an antenna fixing base 62 is defined. The antenna 61 is fixed on the antenna fixing base 62. The antenna fixing base 62 and the antenna 61 are integrally located inside the lower half housing 412. In this way, when an overall sensing device is located in the upper half housing, the antenna and the antenna fixing base can balance a structural relationship inside the ball shaft. In one embodiment, the antenna 61 is a Bluetooth antenna, and the antenna 61 is connected to the micro control unit circuit. For the smart magic cube of the present disclosure, the micro control unit is connected to an external terminal (such as a mobile phone, a tablet computer, a server) by the antenna 61, so that the external terminal can obtain rotation status data of the magic cube detected on the smart magic cube. At the same time, the external terminal can also send control commands to the micro control unit by the antenna 61.

The overall assembly process of the smart magic cube of the present disclosure is as follows. First, the micro control unit and each electronic induction unit are respectively arranged on the first circuit board 511 the second circuit board 512 of the master circuit board 51, and the slave circuit board 52 according to the design requirements. In this process, since not every face sets a PCB board, it is no longer necessary to precisely adjust the vertical relationship between each circuit board, but a mature electronic component mounting process can be used, therefore not only a connection stability between various components is improved, but also the tedious work of deployment is reduced. At the same time, in the case that the master circuit board adopts the PCB board and the slave circuit board adopts the FPC board, the circuit connection between the boards is realized by welding. Then an assembled circuit board is arranged on the circuit board holder 55, and the overall installation and fixation of the sensing device is realized. The entire assembled sensing device, as well as other components such as antenna 61 and antenna base 62, are arranged on the upper half housing or the lower half housing, and then the upper half housing and the lower half housing are combined to form the ball shaft. The rotating shaft are arranged on the ball shaft, and finally each magic cube is arranged on each face according to design requirements, thus realizing the overall assembly of the smart magic cube.

A working principle of the smart magic cube of the present disclosure is as follows. When one face of the magic cube is rotated, the rotating shaft with respect to the face will be rotated, and the rotating shaft drives the magnet located in the rotating shaft to rotate, thus changing the magnetic field direction of the magnet. The change of the direction of the magnetic field will act on the corresponding Hall sensor to generate a corresponding change of current or electromotive force, and the change of the current or electromotive force is transmitted to the micro control unit, so that the control unit can obtain the rotation angle of the rotating shaft by the change of the current or electromotive force. The micro control unit is connected to the external terminal by the Bluetooth antenna, and sends the obtained rotation status of each face to the external terminal, and the micro control unit can accept the control commands sent by the external terminal by the antenna.

The technical features of the above-mentioned embodiments can be combined arbitrarily. To make the description concise, all possible combinations of the technical features in the above-mentioned embodiments are not described. However, as long as there is no contradiction in the combination of these technical features, should be considered as within the scope of the specification.

For those skilled in the art, various other corresponding changes and deformations can be made according to the technical solutions and the ideas described above, and all these changes and deformations should fall within the protection scope of the claims of the present disclosure.

What is claimed is:

1. A method for waking up smart magic cube, comprising:

step S10, detecting acceleration values of an X-axis, a Y-axis, and a Z-axis of the smart magic cube by an accelerometer arranged in the smart magic cube;

step S20, obtaining the acceleration values of the X-axis, the Y-axis, and the Z-axis of the smart magic cube when detecting that an acceleration is generated in any one of directions of the X-axis, the Y-axis, and the Z-axis of the smart magic cube;

step S30, comparing the acceleration values of the X-axis, the Y-axis, and the Z-axis of the smart magic cube with an awakening threshold, and when one of the acceleration values of the X-axis, the Y-axis, and the Z-axis of the smart magic cube is greater than the awakening threshold, sending an awakening signal to a micro control unit of the smart magic cube by the accelerometer;

step S40, restarting a system of the smart magic cube by the micro control unit to enable the smart magic cube to enter a normal working mode;

step S50, starting a firmware program of the smart magic cube, and starting the accelerometer;

step S51, configuring an output data rate of the accelerometer;

step S52, configuring a range of the accelerometer;

step S53, configuring an X offset, a Y offset, and a Z offset of the accelerometer;

step S54, configuring the awakening threshold;

step S55, configuring an awakening interrupt to drive to an interrupt pin;

step S56, when the smart magic cube enters a dormancy mode, executing the step S10;

the step S56 further comprises:

step S561, obtaining a connection information between a wireless communication module of the smart magic cube and terminal devices;

step S562, when the wireless communication module is not connected to any one of the terminal devices, starting a timer, and continuously detecting a connection state of the wireless communication module;

when the wireless communication module is not connected to any one of the terminal devices within a preset timing time, and the acceleration values of the X-axis, Y-axis, and Z-axis of the smart magic cube detected by the accelerometer are all less than the preset acceleration activity threshold, enabling the smart magic cube to enter the dormancy mode; and when the wireless communication module is connected to one of the terminal devices within the preset timing time, or when one of the acceleration values of the X-axis, the Y-axis, and the Z-axis of the smart magic cube detected by the accelerometer is more than the preset acceleration activity threshold, keeping the smart magic cube work in the normal working mode; and step S563, comparing the acceleration values of the X-axis, the Y-axis, and the Z-axis of the smart magic cube with a preset acceleration activity threshold, when one of the acceleration values of the X-axis, the Y-axis, and the Z-axis of the smart magic cube is less than the preset acceleration activity threshold, controlling the smart magic cube to enter the dormancy mode.

2. The method for waking up smart magic cube as recited in claim 1, wherein the step S30 further comprises:

step S31, starting a timer when determining that one of the acceleration values of the X-axis, the Y-axis, and the Z-axis of the smart magic cube is greater than the awakening threshold, and comparing obtained acceleration values continuously with the awakening threshold;

step S32, when the acceleration value continuously obtained within a preset timing time by the timer is greater than the awakening threshold, sending the awakening signal to the micro control unit.

3. The method for waking up smart magic cube as recited in claim 2, wherein the step S32 further comprises:

enabling an interrupt pin of the accelerometer by the accelerometer, enabling an HP filter by the interrupt pin, and enabling the micro control unit to wake up the smart magic cube by the HP filter.

4. The method for waking up smart magic cube as recited in claim 1, wherein the step 51 further comprises:

step 511, configuring an output data rate of the accelerometer as 200 Hz, and configuring a mode of the output data rate of the accelerometer as a high performance mode;

the step 52 further comprises:

step 521, configuring the range of the accelerometer as ±2 g, and configuring a mode of the accelerometer as a low noise mode.

5. The method for waking up smart magic cube as recited in claim 1, wherein when the smart magic cube is in the normal working mode, the method further comprises:

step 60, detecting the acceleration values of the X-axis, the Y-axis, and the Z-axis of the smart magic cube by the accelerometer, and obtaining a posture state of the smart magic cube according to the acceleration values of the X-axis, the Y-axis, and the Z-axis of the smart magic cube.

6. A smart magic cube, comprising:

a ball shaft;

six central blocks;

eight corner blocks; and twelve edge blocks;

wherein the ball shaft is arranged at a center of the smart magic cube, the ball shaft defines a micro control unit, an HP filter, and an accelerometer, and the accelerometer is connected to the micro control unit by the HP filter;

wherein each of rotating shafts in the ball shaft defines one of the six central blocks, one of the twelve edge blocks is arranged between every adjacent two of the six central blocks, and one of the eight corner blocks is arranged between every adjacent three of the twelve edge blocks;

the accelerometer and the micro control unit of the smart magic cube are caused to execute to:

detect acceleration values of an X-axis, a Y-axis, and a Z-axis of the smart magic cube by the accelerometer arranged in the smart magic cube;

obtain the acceleration values of the X-axis, the Y-axis, and the Z-axis of the smart magic cube when detecting that an acceleration is generated in any one of directions of the X-axis, the Y-axis, and the Z-axis of the smart magic cube;

compare the acceleration values of the X-axis, the Y-axis, and the Z-axis of the smart magic cube with an awakening threshold, and when one of the acceleration values of the X-axis, the Y-axis, and the Z-axis of the smart magic cube is greater than the awakening threshold, sending an awakening signal to a micro control unit of the smart magic cube by the accelerometer;

restart a system of the smart magic cube by the micro control unit to enable the smart magic cube to enter a normal working mode;

start a firmware program of the smart magic cube, and starting the accelerometer;

configure an output data rate of the accelerometer;

configure a range of the accelerometer;

configure an X offset, a Y offset and a Z offset of the accelerometer;

configure the awakening threshold;

configure an awakening interrupt to drive to an interrupt pin;

obtain a connection information between a wireless communication module of the smart magic cube and terminal devices; when the wireless communication module is not connected to any one of the terminal devices, starting a timer, and continuously detect a connection state of the wireless communication module; when the wireless communication module is not connected to any one of the terminal devices within a preset timing time, and the acceleration values of the X-axis, Y-axis, and the Z-axis of the smart magic cube detected by the accelerometer are all less than the preset acceleration activity threshold, enable the smart magic cube to enter the dormancy mode; when the wireless communication module is connected to one of the terminal devices within the preset timing time, or when one of the acceleration values of the X-axis, the Y-axis, and the Z-axis of the smart magic cube detected by the accelerometer is more than the preset acceleration activity threshold, keep the smart magic cube work in the normal working mode; and compare the acceleration values of the X-axis, the Y-axis, and the Z-axis of the smart magic cube with a preset acceleration activity threshold, when one of the acceleration values of the X-axis, the Y-axis, and the Z-axis of the smart magic cube is less than the preset acceleration activity threshold, control the smart magic cube to enter the dormancy mode.

7. The smart magic cube as recited in claim 6, wherein the accelerometer and the micro control unit of the smart magic cube are further caused to execute to:

start a timer when determining that one of the acceleration values of the X-axis, the Y-axis, and the Z-axis of the smart magic cube is greater than the awakening threshold, and compare obtained acceleration values continuously with the awakening threshold; and when the acceleration value continuously obtained within a preset timing time by the timer is greater than the awakening threshold, send the awakening signal to the micro control unit.

8. The smart magic cube as recited in claim 7, wherein the accelerometer and the micro control unit of the smart magic cube are further caused to execute to:

enable an interrupt pin of the accelerometer by the accelerometer, and enable an HP filter by the interrupt pin, and enable the micro control unit to wake up the smart magic cube by the HP filter.

9. The smart magic cube as recited in claim 6, wherein the accelerometer and the micro control unit of the smart magic cube are further caused to execute to:

configure an output data rate of the accelerometer as 200 Hz, and configure a mode of the output data rate of the accelerometer as a high performance mode; and configure the range of the accelerometer as ±2 g, and configure a mode of the accelerometer as a low noise mode.

10. The smart magic cube as recited in claim 6, wherein when the smart magic cube is in the normal working mode, the accelerometer and the micro control unit of the smart magic cube are further caused to execute to:

detect the acceleration values of the X-axis, the Y-axis, and the Z-axis of the smart magic cube by the accelerometer, and obtain a posture state of the smart magic cube according to the acceleration values of the X-axis, the Y-axis, and the Z-axis of the smart magic cube.

11. A computer-readable storage medium, having stored thereon instructions that, when executed by a micro control unit and an accelerometer of a smart magic cube, causes the micro control unit and the accelerometer to execute to:

detect acceleration values of an X-axis, a Y-axis, and a Z-axis of the smart magic cube by the accelerometer arranged in the smart magic cube;

obtain the acceleration values of the X-axis, the Y-axis, and the Z-axis of the smart magic cube when detecting that an acceleration is generated in any one of directions of the X-axis, the Y-axis, and the Z-axis of the smart magic cube;

compare the acceleration values of the X-axis, the Y-axis, and the Z-axis of the smart magic cube with an awakening threshold, and when one of the acceleration values of the X-axis, the Y-axis, and the Z-axis of the smart magic cube is greater than the awakening threshold, sending an awakening signal to a micro control unit of the smart magic cube by the accelerometer;

restart a system of the smart magic cube by the micro control unit to enable the smart magic cube to enter a normal working mode;

start a firmware program of the smart magic cube, and starting the accelerometer;

configure an output data rate of the accelerometer;

configure a range of the accelerometer;

configure an X offset, a Y offset and a Z offset of the accelerometer;

configure the awakening threshold;

configure an awakening interrupt to drive to an interrupt pin;

obtain a connection information between a wireless communication module of the smart magic cube and terminal devices; when the wireless communication module is not connected to any one of the terminal devices, starting a timer, and continuously detecting a connection state of the wireless communication module; when the wireless communication module is not connected to any one of the terminal devices within a preset timing time, and the acceleration values of the X-axis, Y-axis, and Z-axis of the smart magic cube detected by the accelerometer are all less than the preset acceleration activity threshold, enabling the smart magic cube to enter the dormancy mode; and when the wireless communication module is connected to one of the terminal devices within the preset timing time, or when one of the acceleration values of the X-axis, the Y-axis, and the Z-axis of the smart magic cube detected by the accelerometer is more than the preset acceleration activity threshold, keeping the smart magic cube work in the normal working mode; and compare the acceleration values of the X-axis, the Y-axis, and the Z-axis of the smart magic cube with a preset acceleration activity threshold, when one of the acceleration values of the X-axis, the Y-axis, and the Z-axis of the smart magic cube is less than the preset acceleration activity threshold, control the smart magic cube to enter the dormancy mode.

12. The computer-readable storage medium as recited in claim 11, wherein the micro control unit and the accelerometer is further caused to execute to:

start a timer when determining that one of the acceleration values of the X-axis, the Y-axis, and the Z-axis of the smart magic cube is greater than the awakening threshold, and compare obtained acceleration values continuously with the awakening threshold; and when the acceleration value continuously obtained within a preset timing time by the timer is greater than the awakening threshold, send the awakening signal to the micro control unit.

13. The computer-readable storage medium as recited in claim 12, wherein the accelerometer and the micro control unit of the smart magic cube are further caused to execute to:

enable an interrupt pin of the accelerometer by the accelerometer, and enable an HP filter by the interrupt pin, and enable the micro control unit to wake up the smart magic cube by the HP filter.

* * * * *